US009844817B2

(12) United States Patent
Hecht

(10) Patent No.: US 9,844,817 B2
(45) Date of Patent: Dec. 19, 2017

(54) REPLACEABLE CUTTING HEAD HAVING THREADED MOUNTING PORTION WITH TWO SPACED APART CONICAL ABUTMENT SURFACES PROVIDED WITH THE SAME CONE ANGLE, TOOL HOLDER AND ROTARY CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 248 days.

(21) Appl. No.: 14/822,967

(22) Filed: Aug. 11, 2015

(65) Prior Publication Data

US 2017/0043410 A1 Feb. 16, 2017

(51) Int. Cl.
*B23B 51/00* (2006.01)
*B23B 31/11* (2006.01)
(Continued)

(52) U.S. Cl.
CPC ....... *B23B 31/1115* (2013.01); *B23B 31/1122* (2013.01); *B23C 5/10* (2013.01); *B23C 5/26* (2013.01); *B23B 2251/02* (2013.01); *B23B 2260/1381* (2013.01); *B23C 2210/02* (2013.01); *B23C 2240/32* (2013.01)

(58) Field of Classification Search
CPC ....... B23C 5/109; B23C 5/10; B23C 2210/02; B23C 2240/32; B23B 31/11; B23B 2251/02
See application file for complete search history.

(56) References Cited

U.S. PATENT DOCUMENTS 1,407,335 A * 2/1922 Reynolds ............ B23B 31/1107 279/100
3,586,353 A * 6/1971 Lorenz .................. E21B 17/042 285/334
(Continued)

FOREIGN PATENT DOCUMENTS

DE 10114240 1/2003

OTHER PUBLICATIONS

International Search Report dated Nov. 2, 2016, issued in PCT counterpart application (No. PCT/IL2016/050798).
(Continued)

*Primary Examiner* — Will Fridie, Jr.
(74) *Attorney, Agent, or Firm* — Womble Carlyle

(57) ABSTRACT

A replaceable cutting head includes a forward cutting portion and a rearward mounting portion. The mounting portion includes a male coupling member that protrudes rearwardly from a head base surface. The male coupling member includes forward and rearward bearing portions and an external thread located therebetween. The forward and rearward bearing portions include respective conically shaped forward and rearward head abutment surface. The forward and rearward head abutment surfaces have the same cone angle. When a cutting tool, including said cutting head and a tool holder having a female coupling member, is in a locked position, the external thread is threadingly engaged in the female coupling member and the forward and rearward head abutment surfaces conically abut corresponding conical shaped surfaces in the female coupling member.

30 Claims, 6 Drawing Sheets

(51) Int. Cl.
*B23C 5/10* (2006.01)
*B23C 5/26* (2006.01)

(56) References Cited

U.S. PATENT DOCUMENTS 4,438,953 A * 3/1984 Timme, Jr. ............ E21B 17/042 285/333
5,114,286 A * 5/1992 Calkins ................... B23B 31/11 408/226
5,971,670 A * 10/1999 Pantzar ............... B23B 31/1107 407/119
6,485,220 B2 * 11/2002 Hecht ..................... B23B 31/11 403/343
7,341,409 B2 3/2008 Jonsson et al.
7,374,376 B2 * 5/2008 Jonsson .............. B23B 31/1107 279/8
7,611,311 B2 * 11/2009 Kakai ................. B23B 31/1107 279/8
9,643,262 B2 * 5/2017 Frota de Souza ........ B23C 5/10
9,643,264 B2 * 5/2017 Frota de Souza ...... B23C 5/109
2001/0013266 A1 8/2001 Isaksson
2008/0304923 A1 * 12/2008 Lehto .................... B23B 31/005 407/100
2014/0205389 A1 7/2014 Azegami et al.
2015/0016905 A1 1/2015 Haimer
2015/0063928 A1 * 3/2015 Maeda ...................... B23C 5/10 407/42
2015/0202690 A1 * 7/2015 Haimer ............... B23B 31/1115 279/99
2016/0228955 A1 8/2016 Leirer et al.

OTHER PUBLICATIONS

Written Opinion dated Nov. 2, 2016, issued in PCT counterpart application (No. PCT/IL2016/050798).

* cited by examiner

REPLACEABLE CUTTING HEAD HAVING THREADED MOUNTING PORTION WITH TWO SPACED APART CONICAL ABUTMENT SURFACES PROVIDED WITH THE SAME CONE ANGLE, TOOL HOLDER AND ROTARY CUTTING TOOL

FIELD OF THE INVENTION

The subject matter of the present application relates to rotary cutting tools of the type in which a replaceable cutting head, having a male coupling member, is removably retained in a female coupling member, of a tool holder, by means of a threaded coupling mechanism.

BACKGROUND OF THE INVENTION

Rotary cutting tools can be provided with a threaded coupling mechanism for securely retaining a replaceable cutting head within a tool holder.

The replaceable cutting head can include a male coupling member and the tool holder can include a female coupling member. The male coupling member can include an external thread and at least one abutment surface. The female coupling member can include an internal thread and at least one abutment surface, that each correspond to the external thread and at the least one abutment surface on the male coupling member.

In some such rotary cutting tools, the male coupling member includes one abutment surface which has a conical shape and the external thread is a straight (i.e., "non-tapered") thread. An example of such a rotary cutting tool is disclosed in, for example, U.S. Pat. No. 6,485,220.

In other such rotary cutting tools, the male coupling member includes one abutment surface which has a conical shape and the external thread is a tapered thread. An example of such a rotary cutting tool is disclosed in, for example, U.S. Pat. No. 7,374,376.

In still other such rotary cutting tools, the male coupling member includes two abutment surfaces, where one abutment surface has a conical shape, the other abutment surface has a cylindrical shape and the external thread is a straight thread. An example of such a rotary cutting tool is disclosed in U.S. Pat. No. 7,341,409.

In yet still other such rotary cutting tools, the male coupling member includes two adjacent conical abutment surfaces and the external thread is a tapered thread. An example of such a rotary cutting tool is disclosed in, for example, US 2015/016905, in which the tapered thread extends in a rearward direction of the coupling member, away from the two adjacent abutment surfaces and towards a spherical supporting region.

SUMMARY OF THE INVENTION

In accordance with a first aspect of the subject matter of the present application there is provided a replaceable cutting head, for rotary cutting operations, having a head longitudinal axis around which the replaceable cutting head rotates in a direction of rotation, the head longitudinal axis extending in a forward to rearward direction, comprising:

a forward portion forming a cutting portion and a rearward portion forming a mounting portion, wherein;

the mounting portion comprises a male coupling member protruding rearwardly from a rearwardly facing head base surface, the head base surface extending transversely with respect to the head longitudinal axis, and defining a boundary between the cutting portion and the mounting portion, the male coupling member comprising:

outwardly facing forward and rearward bearing portions and an external thread located therebetween wherein;

- the forward bearing portion comprises a conically shaped forward head abutment surface that tapers inwardly in a rearward direction defining a forward head cone angle;
- the rearward bearing portion comprises a conically shaped rearward head abutment surface that tapers inwardly in a rearward direction defining a rearward head cone angle; and
- the forward and rearward head cone angles have the same value.

In accordance with a further aspect of the subject matter of the present application, there is also provided a tool holder, having a holder longitudinal axis extending in the forward to rearward direction, comprising a female coupling member extending rearwardly from a forwardly facing holder forward surface, the holder forward surface extending transversely with respect to the holder longitudinal axis, the female coupling member comprising:

inwardly facing forward and rearward supporting portions and an internal thread located therebetween wherein;

- the forward supporting portion comprises a forward holder abutment surface that tapers inwardly in a rearward direction defining a forward holder cone angle;
- the rearward supporting portion comprises a rearward holder abutment surface that that tapers inwardly in a rearward direction defining a rearward holder cone angle; and
- the forward and rearward holder cone angles have the same value.

In accordance with a further aspect of the subject matter of the present application, there is also provided a rotary cutting tool comprising:

a replaceable cutting head; and a tool holder; wherein the rotary cutting tool is adjustable between a released position and a locked position, wherein in the locked position:

- the male coupling member is removably retained in the female coupling member;
- the external and internal threads threadingly engage each other;
- the head base surface abuts the holder forward surface;
- the forward head abutment surface abuts the forward holder abutment surface; and the rearward head abutment surface abuts the rearward holder abutment surface.

It is understood that the above-said is a summary, and that features described hereinafter may be applicable in any combination to the subject matter of the present application, for example, any of the following features may be applicable to the replaceable cutting head, the tool holder or the rotary cutting tool:

The forward head cone angle can be in the range of $5° \leq \alpha \leq 7°$. The rearward head cone angle can be in the range of $5° \leq \beta \leq 7°$.

Preferably, the forward and rearward head cone angles can be equal to exactly 6°.

The external thread can be a straight thread.

The forward head abutment surface lies on an imaginary external forward cone centered about the head longitudinal axis. The plurality of external thread crests define an imaginary external crest cylinder that is axially delimited by the forward and rearward bearing portions. The imaginary external forward cone can intersect the imaginary external crest cylinder.

The rearward head abutment surface lies on an imaginary external rearward cone centered about the head longitudinal axis. The plurality of external thread roots define an imaginary external root cylinder that is axially delimited by the forward and rearward bearing portions. The imaginary external rearward cone can intersect the imaginary external root cylinder.

The major diameter of the external thread closest to the forward bearing portion defines a major external diameter that can be less than a minimum external forward diameter of the forward head abutment surface.

The minor diameter of the external thread closest to the rearward bearing portion defines a minor external diameter that can be greater than a maximum external rearward diameter of the rearward head abutment surface.

A maximum external rearward diameter of the rearward head abutment surface can be less than a minimum external forward diameter of the forward head abutment surface.

The forward head abutment surface has a forward head cone axial height. The rearward head abutment surface has a rearward head cone axial height. The rearward head cone axial height can be greater than the forward head cone axial height.

The head base surface can be perpendicular to the head longitudinal axis.

The forward holder cone angles can be in the range of $4.7° \leq \gamma \leq 6.7°$. The rearward holder cone angle can be in the range of $4.7° \leq \delta \leq 6.7°$.

Preferably, the forward and rearward holder cone angles can be equal to 5.7°.

The internal thread can be a straight thread.

The forward holder abutment surface lies on an imaginary internal forward cone centered about the holder longitudinal axis. The plurality of internal thread crests define an imaginary internal crest cylinder that is axially delimited by the forward and rearward supporting portions. The imaginary internal forward cone can intersect the imaginary internal crest cylinder.

The rearward holder abutment surface lies on an imaginary internal rearward cone centered about the holder longitudinal axis. The plurality of internal thread roots define an imaginary internal root cylinder that is axially delimited by the forward and rearward supporting portions. The imaginary internal rearward cone can intersect an imaginary internal root cylinder.

The major diameter of the internal thread closest to the forward supporting portion defines a major internal diameter that can be less than a minimum internal forward diameter of the forward holder abutment surface.

The minor diameter of the internal thread closest to the rearward supporting portion defines a minor internal diameter that can be greater than a maximum internal rearward diameter of the rearward holder abutment surface.

A maximum internal rearward diameter of the rearward holder abutment surface can be less than a minimum internal forward diameter of the forward holder abutment surface.

The forward holder abutment surface has a forward holder cone axial height. The rearward holder abutment surface has a rearward holder cone axial height. The rearward holder cone axial height can be greater than the forward holder cone axial height.

In the released position: the male coupling member can be located outside of the female coupling member. The forward head cone angle can be in the range of $5° \leq \alpha \leq 7°$. The rearward head cone angle can be in the range of $5° \leq \beta \leq 7°$. The forward holder cone angles can be in the range of $4.7° \leq \gamma \leq 6.7°$. The rearward holder cone angle can be in the range of $4.7° \leq \delta \leq 6.7°$.

In the released position: the forward and rearward head cone angles can be greater than the forward and rearward holder cone angles by no more than 0.6°.

Preferably, in the released position, the forward and rearward head cone angles can be greater than the forward and rearward holder cone angles by 0.3°.

In the locked position, the forward and rearward supporting portions are elastically deformed so that the forward and rearward head cone angles and the forward and rearward holder cone angles have the same value.

The rotary cutting tool can be further adjustable between the released position and a first pre-locked position, before the locked position, and in the first pre-locked position: the external and internal threads can threadingly engage each other. The head base surface can be spaced apart from the holder forward surface by a first forward distance. The forward head abutment surface can be in initial contact with the forward holder abutment surface. The rearward head abutment surface can be spaced apart from the rearward holder abutment surface by a first rearward distance.

The rotary cutting tool can be further adjustable between the first pre-locked position and a second pre-locked position, before the locked position, and in the second pre-locked position: the external and internal threads can threadingly engage each other. The head base surface can be spaced apart from the holder forward surface by a second forward distance, the second forward distance being less than the first forward distance. The forward head abutment surface can be in contact with the forward holder abutment surface. The rearward head abutment surface can be in initial contact with the rearward holder abutment surface.

The forward head abutment surface has a forward head cone axial height. The rearward head abutment surface has a rearward head cone axial height. The forward holder abutment surface has a forward holder cone axial height. The rearward holder abutment surface has a rearward holder cone axial height. The forward head cone axial height can be greater than the forward holder cone axial height. The rearward head cone axial height can be greater than the rearward holder cone axial height.

BRIEF DESCRIPTION OF THE FIGURES

For a better understanding of the present application and to show how the same may be carried out in practice, reference will now be made to the accompanying drawings, in which.

Figure 1:
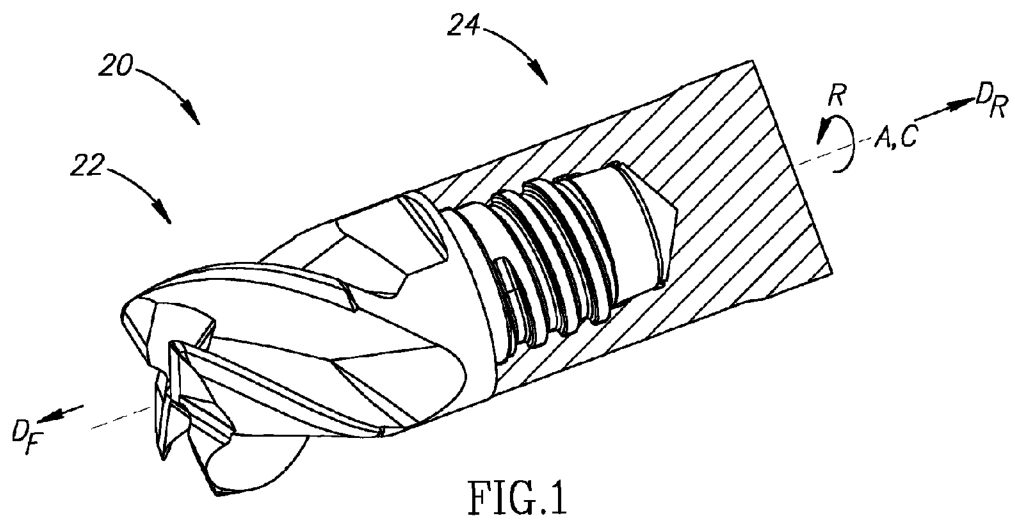
FIG. 1 is a perspective longitudinal cross-sectional view of a rotary cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
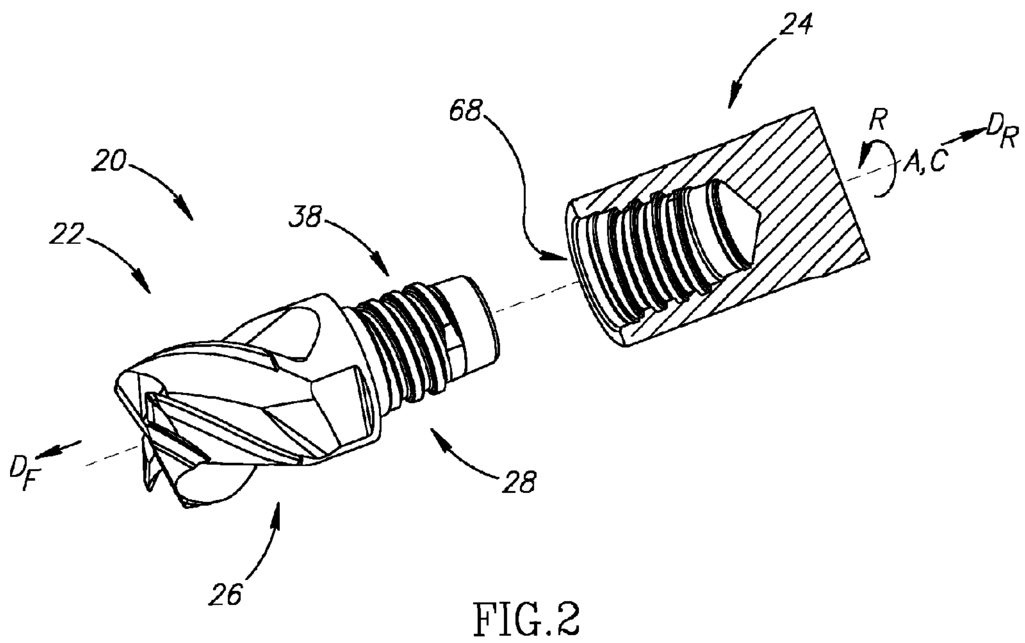
FIG. 2 is an exploded perspective longitudinal cross-sectional view of the rotary cutting tool shown in FIG. 1.

Attention is first drawn to FIGS. 1 and 2 showing a rotary cutting tool 20 of the type used for milling operations, specifically end milling, in accordance with embodiments of the subject matter of the present application. The rotary cutting tool 20 includes a replaceable cutting head 22 that has a head longitudinal axis A, around which the replaceable cutting head 22 rotates in a direction of rotation R. The head longitudinal axis A extends in a forward $D_F$ to rearward direction $D_R$. The replaceable cutting head 22 can be typically made from cemented carbide. The rotary cutting tool 20 also includes a tool holder 24. The tool holder 24 can be typically made from steel. In the embodiment shown, the cutting head 22 is devoid of a central coolant passage extending along the head longitudinal axis A, though in other embodiments such a coolant passage may be present. The replaceable cutting head 22 can be removably retained in the tool holder 24 by means of a threaded coupling mechanism. Such a threaded coupling mechanism could possibly be advantageous for other types of rotary cutting operations than that stated hereinabove, such as, for example, reaming or drilling.

It should be appreciated that use of the terms "forward" and "rearward" throughout the description and claims refer to a relative position in a direction of the head longitudinal axis A towards the left and right, respectively, in FIGS. 4 to 8, and 10 to 11.

Figure 3:
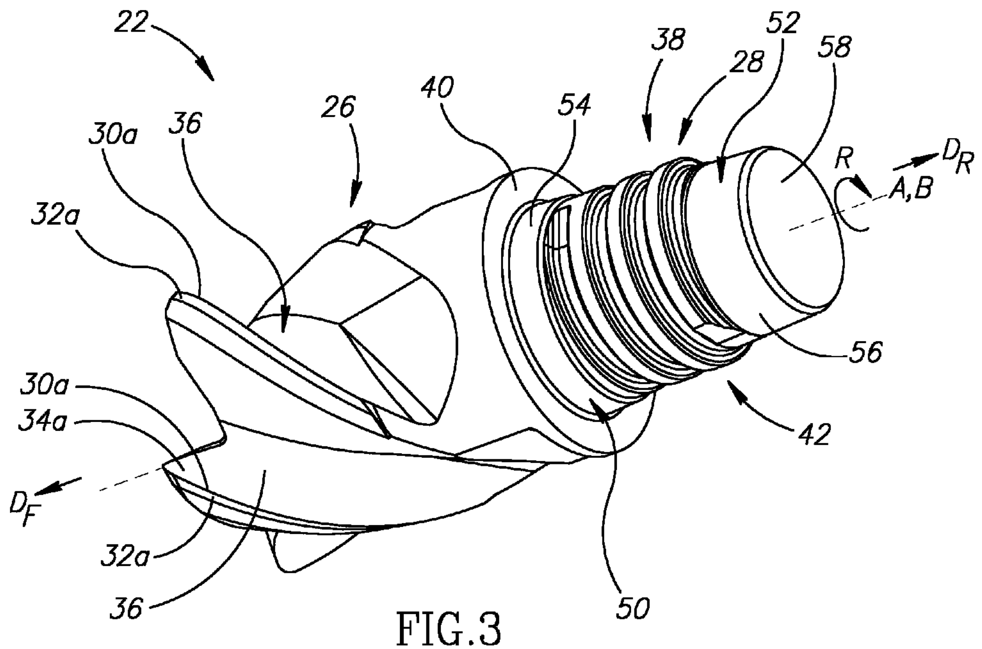
FIG. 3 is a perspective view of a replaceable cutting head shown in FIGS. 1 and 2.
Figure 4:
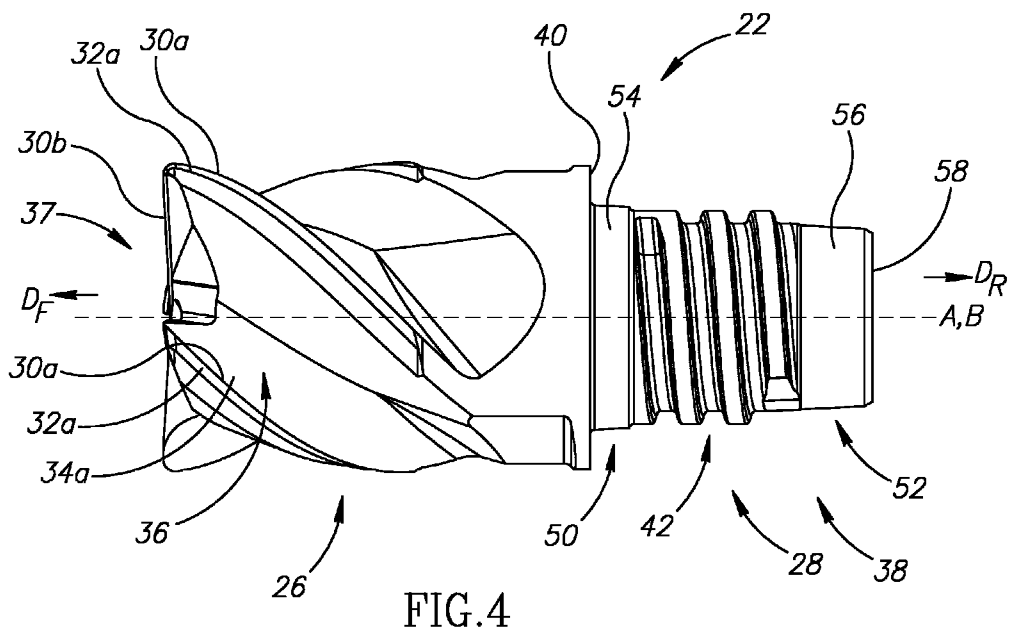
FIG. 4 is a side view of the replaceable cutting head shown in FIG. 3.
Figure 5:
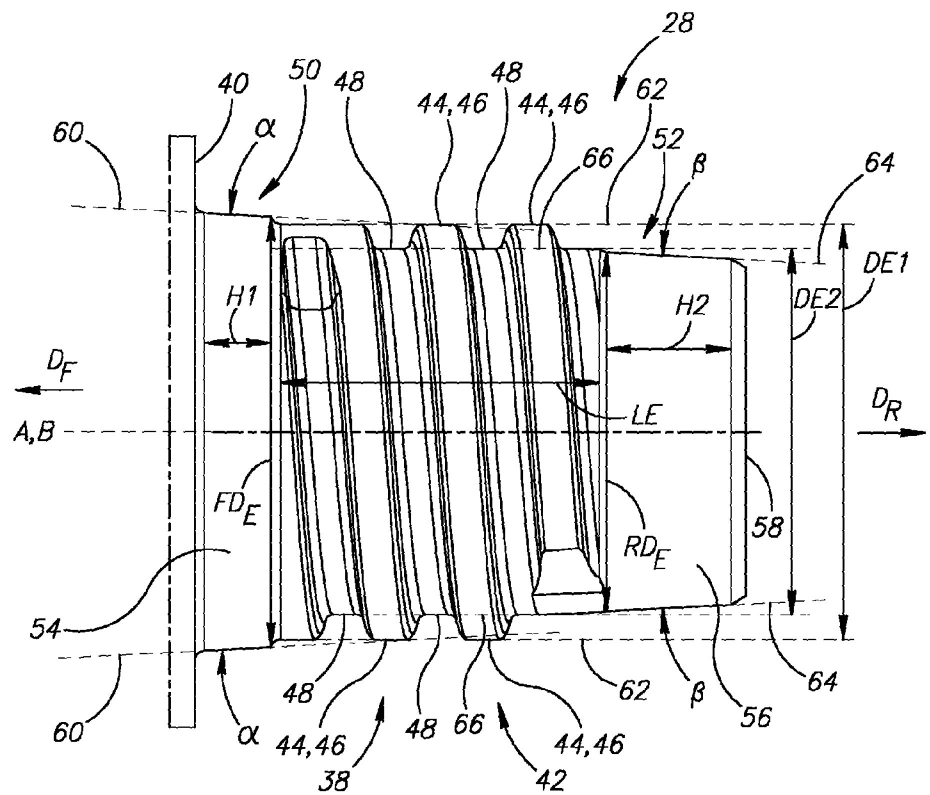
FIG. 5 is a detail of FIG. 4.

Reference is now made to FIGS. 3 to 5. The replaceable cutting head 22 has a forward portion that forms a cutting portion 26 and a rearward portion that forms a mounting portion 28.

In accordance with some embodiments of the subject matter of the present application the replaceable cutting head 22 can be formed from a unitary integral one-piece construction. This provides an advantage in that the replaceable cutting head 22 has no detachable cutting inserts (not shown). Such detachable cutting inserts can be replaced periodically and this can be a time consuming procedure. There is also a possibility that threaded screws (not shown), for example, which can be used to releasably retain the detachable cutting inserts to the replaceable cutting head 22 can be mislaid and/or lost during the replacement operation.

Referring to FIGS. 3 and 4, the cutting portion 26 includes at least one peripheral cutting edge 30. In this non-limiting example shown in the drawings, the at least one peripheral cutting edge 30 can extend helically about the head longitudinal axis A. Moreover, in the non-limiting example shown, there can be exactly four peripheral cutting edges. Each peripheral cutting edge 30 is formed at the intersection of a peripheral relief surface 32, and a peripheral rake surface 34. The peripheral relief surface 32 is located rotationally behind the peripheral cutting edge 30 and the peripheral rake surface 34 is located rotationally ahead of the peripheral cutting edge 30, both in respect to the direction of rotation R. The orientation of the peripheral cutting edge 30 allows metal cutting operations to be performed. In accordance with some embodiments of the subject matter of the present application the cutting portion 26 can include at least one flute 36 for evacuating chips (not shown) that are produced during the cutting operation. One flute 36 is associated to each peripheral cutting edge 30. The replaceable cutting head 22 can include one or more the end cutting edges **30*b* at an end face 37 of the cutting portion 26. In this non-limiting example shown in the drawings, the replaceable cutting head 22 can include exactly four end cutting edges 30*b***.

Making reference now to FIGS. 4 and 5, the mounting portion 28 includes a male coupling member 38 that protrudes rearwardly from a rearwardly facing head base surface 40. The head base surface 40 extends transversely with respect to the head longitudinal axis A and defines a boundary between the cutting portion 26 and the mounting portion 28. That is to say, the cutting portion 26 is formed forward of the head base surface 40 and the mounting portion 28 is formed rearward of the head base surface 40. In accordance with some embodiments of the subject matter of the present application the male coupling member 38 can be rigid. The head base surface 40 can be perpendicular to the head longitudinal axis A. The head base surface 40 is intended to abut a corresponding surface on the tool holder 24 when the rotary cutting tool 20 is in a locked position, as will be described hereinafter.

The male coupling member 38 includes an external thread 42. Referring to FIG. 5, the external thread 42 includes an external thread ridge 44 that extends helically about an external thread axis B forming a plurality of external thread crests 46 and a plurality of external thread roots 48. The external thread axis B is co-incident with the head longitudinal axis A. Thus, the external thread portion 42 and the replaceable cutting head 22 are co-axial. The plurality of external thread crests 46 define the major diameter and the plurality of external thread roots 48 define the minor diameter of the external thread 42, respectively. The external thread has an external thread length LE, measured in a direction of the external thread axis B. In accordance with some embodiments of the subject matter of the present application, the external thread 42 can have approximately three turns.

In accordance with some embodiments of the subject matter of the present application the external thread 42 can be a straight thread. It should be appreciated that the term "straight thread" throughout the description and claims relates to a thread where the thread ridge extends about a cylinder and thus the thread crests are equidistant from the thread longitudinal axis. Similarly, it should be appreciated that the term "tapered thread" throughout the description and claims relates to a thread where the thread ridge extends about a cone and thus the thread crests decrease in distance from the thread longitudinal axis in the rearward direction. By virtue of the external thread 42 being a straight thread, the replaceable cutting head 22 is easier to manufacture than if, for example, the external thread 42 is tapered.

As shown in FIGS. 4 and 5, the male coupling member 38 includes two bearing portions, a forward bearing portion 50 and a rearward bearing portion 52 that each face outwardly away from the head longitudinal axis A. That is to say, the forward bearing portion 50 and a rearward bearing portion 52 face generally radially outwardly. The forward and rearward bearing portions 50, 52 are located either side of the external thread 42. Stated differently, the external thread 42 is located between the forward and rearward bearing portions 50, 52.

When the external thread 42 is a straight thread, an imaginary external crest cylinder 62 is defined by the plurality of external thread crests 46 of the external thread 42 and is axially delimited by the forward and rearward bearing portions 50, 52. Moreover, an imaginary external root cylinder 66 is defined by the plurality of external thread roots 48 of the external thread 42 and is axially delimited by the forward and rearward bearing portions 50, 52.

The forward bearing portion 50 includes a forward head abutment surface 54 that tapers inwardly in a rearward direction $D_R$ to define a forward head cone angle α. That is to say, the forward head abutment surface 54 has a conical shape facing generally radially outwards, where the forward head cone angle α is an internal angle. In accordance with some embodiments of the subject matter of the present application, the forward head abutment surface 54 can be frusto-conical. The forward head cone angle α can be in the range of $5° \leq \alpha \leq 7°$. Preferably, the forward head cone angle α can be equal to exactly 6°. Stated differently, forward head abutment surface 54 can define an angle of 3° with respect to the head longitudinal axis A. It is noted that the forward head abutment surface 54 is intended to abut a corresponding surface on the tool holder 24 when the rotary cutting tool 20 is in a locked position, as will be described hereinafter.

It should be appreciated that use of the terms "radially inward/inwardly" and "radially outward/outwardly" throughout the description and claims refer to a relative position in a perpendicular direction in relation to the head longitudinal axis A and/or holder longitudinal axis C, towards and away from the respective axis, in FIGS. 4 to 8, and 10 to 11. It should further be appreciated that use of the term "cone angle" throughout the description refers to an angle formed by the tapered surfaces of a cone, in a longitudinal cross-section. It is noted that the term "longitudinal cross-section" refers to a cross-section taken in a plane containing the longitudinal axis.

The forward head abutment surface 54 lies on an imaginary external forward cone 60 centered about the head longitudinal axis A. That is to say, the imaginary external forward cone 60 is co-axial with the male coupling member 38. The imaginary external forward cone 60 is a right circular cone. In accordance with some embodiments of the subject matter of the present application, the imaginary external forward cone 60 can intersect the imaginary external crest cylinder 62.

In accordance with some embodiments of the subject matter of the present application, a forward portion of the forward bearing portion 50 can be located adjacent the head base surface 40. The intersection of the forward bearing portion 50 and the head base surface 40 can be concavely curved. A rearward portion of the forward bearing portion 50 can be located adjacent the external thread 42.

The rearward bearing portion 52 includes a rearward head abutment surface 56 that tapers inwardly in a rearward direction $D_R$ to define a rearward head cone angle β. That is to say, the rearward head abutment surface 56 has a conical shape facing generally radially outwards, where the rearward head cone angle β is an internal angle. In this non-limiting example shown in the drawings the rearward head abutment surface 56 can be frusto-conical. In accordance with some embodiments of the subject matter of the present application, the rearward head cone angle β can be in the range of $5° \leq \beta \leq 7°$. Preferably, the rearward head cone angle β can be equal to 6°. Stated differently, the rearward head abutment surface 56 can define an angle of 3° with respect to the head longitudinal axis A. It is noted that the rearward head abutment surface 56 is intended to abut a corresponding surface on the tool holder 24 when the rotary cutting tool 20 is in a locked position, as will be described hereinafter.

The rearward head abutment surface 56 lies on an imaginary external rearward cone 64 centered about the head longitudinal axis A. That is to say, the imaginary external rearward cone 64 is co-axial with the male coupling member 38. The imaginary external rearward cone 64 is a right circular cone. In accordance with some embodiments of the subject matter of the present application, the imaginary external rearward cone 64 can intersect the imaginary external root cylinder 66.

In accordance with some embodiments of the subject matter of the present application, a forward portion of the rearward bearing portion 52 can be located adjacent the external thread 42. A rearward portion of the rearward bearing portion 52 can be located adjacent a head rear surface 58 of the male coupling member 38. The intersection of the rearward bearing portion 52 and the head rear surface 58 can be beveled. The head rear surface 58 can be perpendicular to the head longitudinal axis A.

The forward and rearward head cone angles α, β have the same value. Thus advantageously, the angle of rotation of a grinding wheel (used for manufacture of the replaceable cutting head 22), does not need to be reconfigured when the forward and rearward head abutment surfaces 54, 56 are ground. It should be appreciated that the expression "same value", as applied to the cone angles α, β, means within ±0.5°.

The forward head abutment surface 54 has a forward head cone axial height H1, as measured in the direction of the head longitudinal axis A. The rearward head abutment surface 56 has a rearward head cone axial height H2, as measured in the direction of the head longitudinal axis A. In accordance with some embodiments of the subject matter of the present application, H1 can typically have a value of 1.3 mm and H2 can typically have a value of 2.5 mm. The rearward head cone axial height H2 can be greater than the forward head cone axial height H1. The external thread length LE can be greater than the forward head cone axial height H1. The external thread length LE can be greater than the rearward head cone axial height H2.

As further shown in FIG. 5, the major diameter of the external thread 42 closest to the forward bearing portion 50 defines a major external diameter DE1. In accordance with some embodiments of the subject matter of the present application the major external diameter DE1 can be less than a minimum external forward diameter $FD_E$ of the forward head abutment surface 54.

The minor diameter of the external thread 42 closest to the rearward bearing portion 52 defines a minor external diameter DE2. In accordance with some embodiments of the subject matter of the present application the minor external diameter DE2 can be greater than a maximum external rearward diameter $RD_E$ of the rearward head abutment surface 56. The maximum external rearward diameter $RD_E$ of the rearward head abutment surface 56 can be less than the minimum is external forward diameter $FD_E$ of the forward head abutment surface 54.

Figure 6:
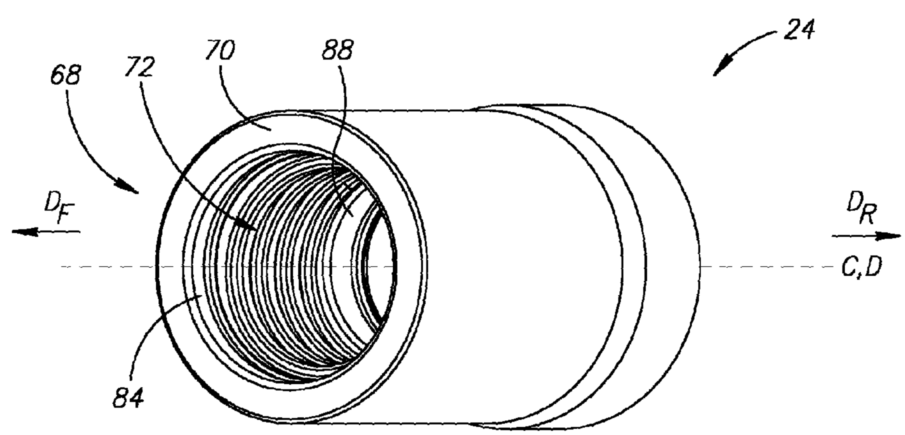
FIG. 6 is a perspective view of a tool holder shown in FIGS. 1 and 2.
Figure 7:
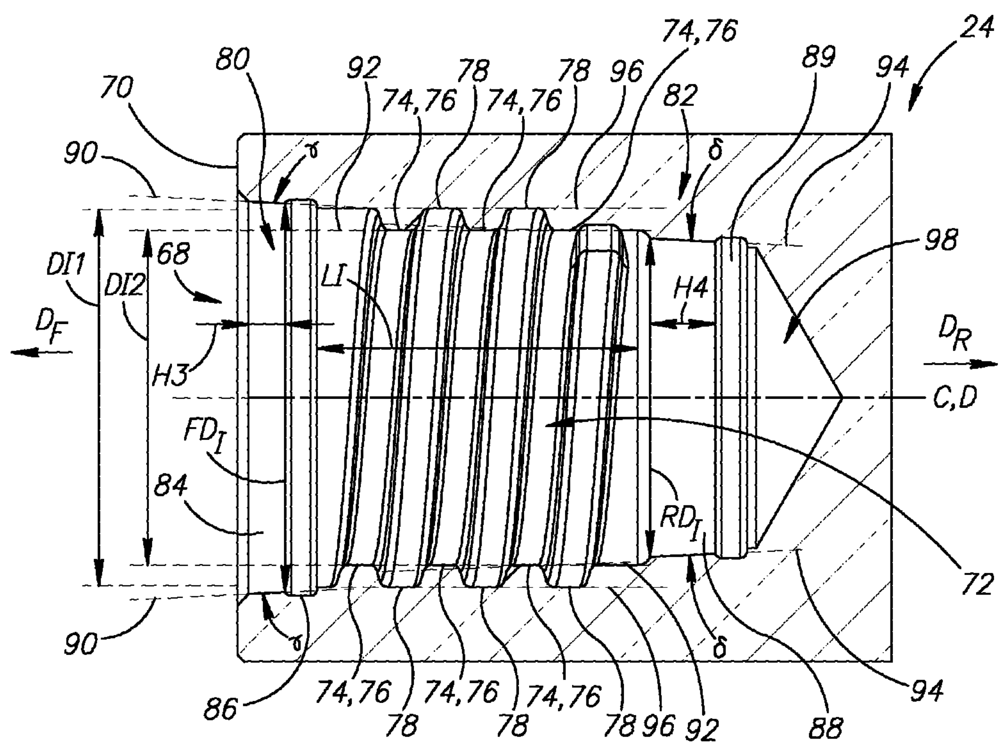
FIG. 7 is a longitudinal cross-sectional view of the tool holder shown in FIG. 6.
Figure 8:
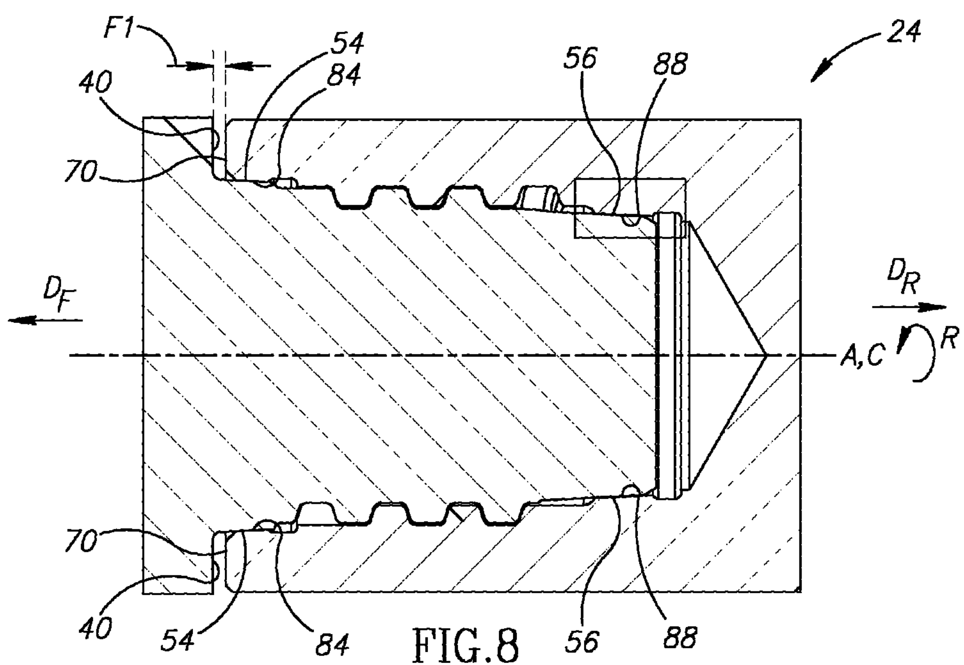
FIG. 8 is a detailed longitudinal cross-sectional view of the rotary cutting tool shown in FIGS. 1 and 2, when the rotary cutting tool is in a first pre-locked position.

Another aspect of the subject matter of the present application relates to the tool holder 24. Referring now to FIGS. 6 and 7, the tool holder 24 has a holder longitudinal axis C that extends in the forward $D_F$ to rearward direction $D_R$. The tool holder 24 includes a female coupling member 68 that extends rearwardly from a forwardly facing holder forward surface 70. The holder forward surface 70 extends transversely with respect to the holder longitudinal axis C. In accordance with some embodiments of the subject matter of the present application the holder forward surface 70 can be perpendicular to the holder longitudinal axis C.

The female coupling member 68 includes an internal thread 72. As shown in a longitudinal cross-sectional view of the female coupling member 68 (i.e. FIG. 7), the internal thread 72 includes an internal thread ridge 74 that extends helically about an internal thread axis D forming a plurality of internal thread crests 76 and a plurality of internal thread roots 78. The internal thread axis D is co-incident with the holder longitudinal axis C. Thus, the internal thread portion 72 is co-axial with the tool holder 24. The plurality of internal thread crests 76 define the minor diameter and the plurality of internal thread roots 78 define the major diameter of the internal thread 72, respectively. The internal thread has an internal thread length LI, measured in a direction of the internal thread axis D. In accordance with some embodiments of the subject matter of the present application, the internal thread 72 can have approximately three turns.

In accordance with some embodiments of the subject matter of the present application the internal thread 72 can be a straight thread. By virtue of the internal thread 72 being a straight thread, the tool holder 24 is easier to manufacture than if, for example, the internal thread 72 is tapered.

As shown in FIG. 7, the female coupling member 68 includes two supporting portions, a forward supporting portion 80 and a rearward supporting portion 82 that each face inwardly towards the holder longitudinal axis C. That is to say, the forward supporting portion 80 and a rearward supporting portion 82 face generally radially inwardly. The forward and rearward supporting portions 80, 82 are located either side of the internal thread 72. Stated differently, the internal thread 72 is located between the forward and rearward supporting portions 80, 82.

When the internal thread 72 is a straight thread, an imaginary internal crest cylinder 92 is defined by the plurality of internal thread crests 76 of the internal thread 72 and is axially delimited by the forward and rearward supporting portions 80, 82. Moreover, an imaginary internal root cylinder 96 is defined by the plurality of internal thread roots 78 of the internal thread 72 and is axially delimited by the forward and rearward supporting portions 80, 82.

The forward supporting portion 80 includes a forward holder abutment surface 84 that tapers inwardly in a rearward direction $D_R$ to define a forward holder cone angle γ. That is to say, the forward holder abutment surface 84 has a conical shape facing generally radially inwards, where the forward holder cone angle γ is an external angle. In accordance with some embodiments of the subject matter of the present application, the forward holder abutment surface 84 can be frusto-conical. The forward holder cone angle γ can be in the range of $4.7° \leq \gamma \leq 6.7°$. Preferably, the forward holder cone angle γ can be equal to 5.7°. Stated differently, the forward holder abutment surface 84 can define an angle of 2.85° with respect to the holder longitudinal axis C.

The forward holder abutment surface 84 lies on an imaginary internal forward cone 90 centered about the holder longitudinal axis (C). That is to say, the imaginary internal forward cone 90 is co-axial with the female coupling member 68. The imaginary internal forward cone 90 is a right circular cone. In accordance with some embodiments of the subject matter of the present application, the imaginary internal forward cone 90 can intersect the imaginary internal root cylinder 96.

In accordance with some embodiments of the subject matter of the present application, the forward supporting portion 80 can include a forward annular groove 86 and the forward holder abutment surface 84 can be spaced apart from the internal thread 72 by the forward annular groove 86. A forward portion of the forward supporting portion 80 can be located adjacent the holder forward surface 70. The intersection of the forward supporting portion 80 and the holder forward surface 70 can be beveled.

The rearward supporting portion 82 includes a rearward holder abutment surface 88 that tapers inwardly in a rearward direction $D_R$ to define a rearward holder cone angle δ. That is to say, the rearward holder abutment surface 88 has a conical shape facing generally radially inwards, where the rearward holder cone angle δ is an external angle. In accordance with some embodiments of the subject matter of the present application, the rearward holder abutment surface 88 can be frusto-conical. The rearward holder cone angle δ can be in the range of $4.7° \leq \delta \leq 6.7°$. Preferably, the rearward holder cone angle δ is equal to 5.7°. Stated differently, the rearward holder abutment surface 88 can define an angle of 2.85° with respect to the holder longitudinal axis C.

The rearward holder abutment surface 88 lies on an imaginary internal rearward cone 94 centered about the holder longitudinal axis C. That is to say, the imaginary internal rearward cone 94 is co-axial with the female coupling member 68. The imaginary internal rearward cone 94 is a right circular cone. In accordance with some embodiments of the subject matter of the present application, the imaginary internal rearward cone 94 can intersect the imaginary internal crest cylinder 92.

In accordance with some embodiments of the subject matter of the present application, a forward portion of the rearward supporting portion 82 can be located adjacent the internal thread 72. The rearward supporting portion 82 can include a rearward annular groove 89 and the rearward holder abutment surface 88 can be spaced apart from a rear end 98 of the female coupling member 68 by the rearward annular groove 89.

The forward and rearward holder cone angles γ, δ have the same value. Thus advantageously, when the forward and rearward holder abutment surfaces 84, 88 are formed, for example via turning operations, during manufacture of the tool holder 24, the turning tool does not need to be reconfigured. It should be appreciated that the expression "same value", as applied to the cone angles γ, δ, means within ±0.5°.

The forward holder abutment surface 84 has a forward holder cone axial height H3, as measured in the direction of the holder longitudinal axis C. The rearward holder abutment surface 88 has a rearward holder cone axial height H4, as measured in the direction of the holder longitudinal axis C. In accordance with some embodiments of the subject matter of the present application, H3 can typically have a value of 0.8 mm and H4 can typically have a value of 1.4 mm. The rearward holder cone axial height H4 can be greater than the forward holder cone axial height H3. The internal thread length LI can be greater than the forward holder cone axial height H3. The internal thread length LI can be greater than the rearward holder cone axial height H4.

As shown in FIG. 7, the major diameter of the internal thread 72 closest to the forward supporting portion 80 defines a major internal diameter DI1. In accordance with some embodiments of the subject matter of the present application the major internal diameter DI1 can be less than a minimum internal forward diameter $FD_I$ of the forward holder abutment surface 84.

The minor diameter of the internal thread 72 closest to the rearward supporting portion 82 defines a minor internal diameter DI2. In accordance with some embodiments of the subject matter of the present application the minor internal diameter DI2 can be greater than a maximum internal rearward diameter $RD_I$ of the rearward holder abutment surface 88. The maximum internal rearward diameter $RD_I$ of the rearward holder abutment surface 88 can be less than the minimum internal forward diameter $FD_I$ of the forward holder abutment surface 84.

Another aspect of the subject matter of the present application relates to a rotary cutting tool 20 that includes the replaceable cutting head 22 and tool holder 24 as defined herein above. The rotary cutting tool 20 is adjustable between a released position and a locked position. In the released position of the rotary cutting tool 20, as shown in FIG. 2, the rotary cutting tool 20 is unassembled and the male coupling member 38 is located outside of the female coupling member 68. In accordance with some embodiments of the subject matter of the present application, in the released position, the forward and rearward head cone angles α, β can be greater than the forward and rearward holder cone angles γ, δ by no more than 0.6°. Preferably, forward and rearward head cone angles α, β can be greater than the forward and rearward holder cone angles γ, δ by 0.3°.

Figure 9:
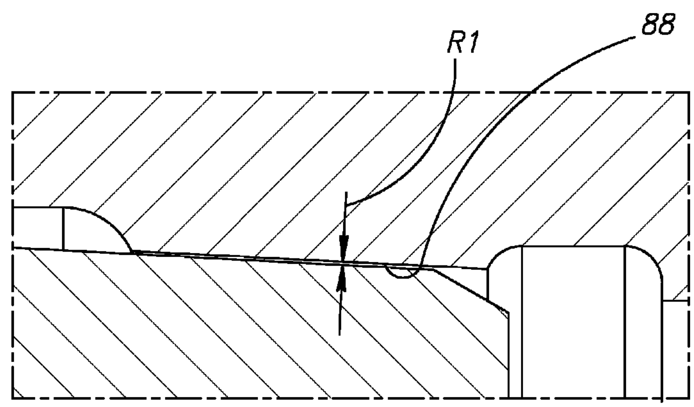
FIG. 9 is a detail of FIG. 8.

Assembly of the rotary cutting tool 20 is accomplished by performing the following steps. The male coupling member 38 is inserted into the female coupling member 68. The external thread 42 is turned in a direction against the direction of rotation R within the internal thread 72, so that the external and internal threads 42, 72 threadingly engage each other, until the forward head abutment surface 54 comes into initial contact with the forward holder abutment surface 84, attaining a first pre-locked position of the rotary cutting tool 20 (see FIG. 8). Clearly, once the external and internal thread portions 42, 72 threadingly engage, any further rotation of the external thread 42 in a direction against the direction of rotation R draws the replaceable cutting head 22 towards the tool holder 24. As seen in a longitudinal cross-sectional view of the rotary cutting tool in the first pre-locked position of the rotary cutting tool 20 (i.e. FIG. 8), the head base surface 40 is spaced apart from the holder forward surface 70 by a first forward distance F1. As shown in FIG. 9, the rearward head abutment surface 56 is spaced apart from the rearward holder abutment surface 88 by a first rearward distance R1. According to one embodiment of the present application, when the forward head cone angle α of the forward head abutment surface 54 is greater than the forward holder cone angle γ of the forward holder abutment surface 84, it is ensured that the initial contact between the forward head abutment surface 54 and the forward holder abutment surface 84 is made at the forward portion of the forward holder abutment surface 84, thereby increasing the rigidity of the coupling between the male and female coupling members 38, 68 at the forward bearing and supporting portions 50, 80 when the locked position of the rotary cutting tool 20 is attained.

Figure 10:
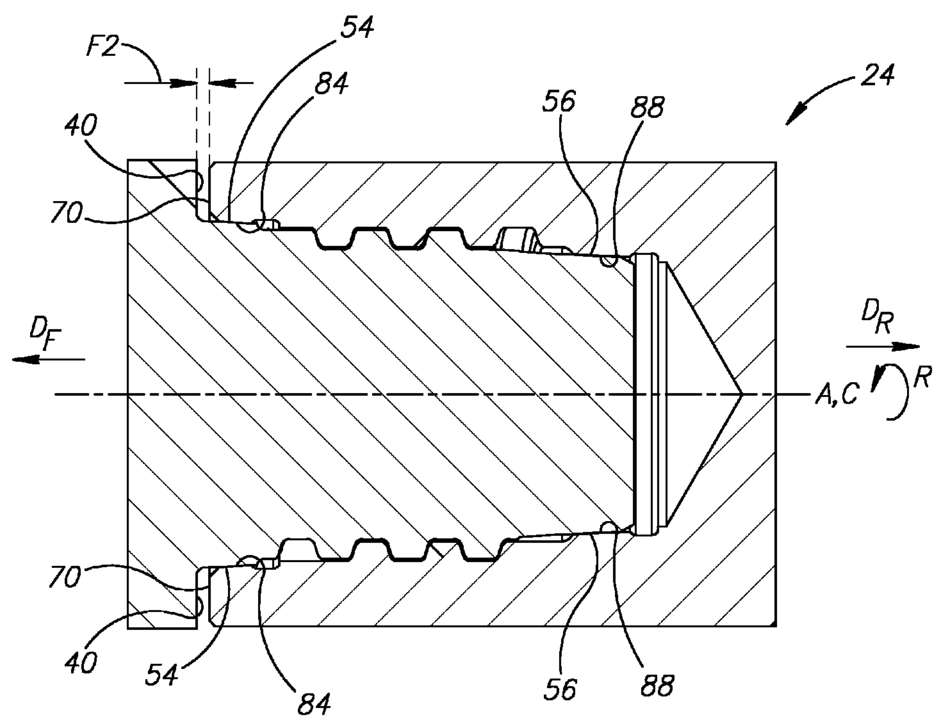
FIG. 10 is an analogous view shown in FIG. 8, when the rotary cutting tool is in a second pre-locked position.

The replaceable cutting head 22 is rotated further in a direction against the direction of rotation R, until the rearward head abutment surface 56 comes into initial contact with the rearward holder abutment surface 88, attaining a second pre-locked position of the rotary cutting tool 20 (see FIG. 10, showing a longitudinal cross-sectional view of the rotary cutting tool 20 in a second pre-locked position). In the second pre-locked position of the rotary cutting tool 20, the head base surface 40 is spaced apart from the holder forward surface 70 by a second forward distance F2, the second forward distance F2 being less than the first forward distance F1. Clearly, the forward head abutment surface 54 remains in contact with the forward holder abutment surface 84. According to one embodiment of the present application, when the rearward head cone angle β of the rearward head abutment surface 56 is greater than the rearward holder cone angle δ of the rearward holder abutment surface 88, it is ensured that the initial contact between the rearward head abutment surface 56 and the rearward holder abutment surface 88 is made at the forward portion of the rearward holder abutment surface 88, thereby increasing the rigidity of the coupling between the male and female coupling members 38, 68 at the rearward bearing and supporting portions 52, 82 when the locked position is attained. Since the replaceable cutting head 22 is made of a harder material than the tool holder 24, and also in view of the conical abutment surfaces, during the rotation of the replaceable cutting head 22 relative to the tool holder 24, from the first pre-locked position to the second pre-locked position of the rotary cutting tool 20, the forward head abutment surface 54 urges the forward holder abutment surface 84 in a radially outward direction, so that the forward supporting portion 80 deforms.

Figure 11:
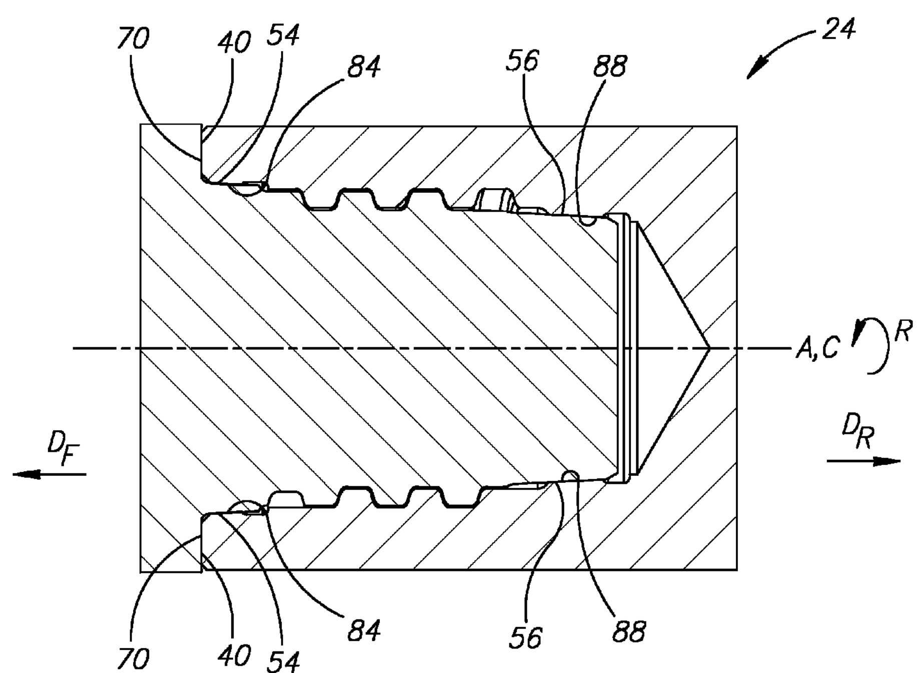
FIG. 11 is an analogous view shown in FIG. 8, when the rotary cutting tool is in a locked position.

The replaceable cutting head 22 is rotated further in a direction against the direction of rotation R, until the head base surface 40 abuts the holder forward surface 70, attaining the locked position of the rotary cutting tool 20 (see FIG. 11, showing a longitudinal cross-sectional view of the rotary cutting tool 20 in a locked position). In the locked position of the rotary cutting tool 20, the male coupling member 38 is removably retained in the female coupling member 68. The head longitudinal axis A is co-incident with the holder longitudinal axis C. The external and internal threads 42, 72 threadingly engage each other. The forward head abutment surface 54 abuts the forward holder abutment surface 84. The rearward head abutment surface 56 abuts the rearward holder abutment surface 88. The head base surface 40 abuts the holder forward surface 70. Again, since the replaceable cutting head 22 is made of a harder material than the tool holder 24, and also in view of the conical abutment surfaces, during the rotation of the replaceable cutting head 22 relative to the tool holder 24, from the second pre-locked position to the locked position of the rotary cutting tool 20, the forward head abutment surface 54 urges the forward holder abutment surface 84 further in a radially outward direction, and further deformation of the forward supporting portion 80 occurs.

Moreover, the rearward head abutment surface 56 urges the rearward holder abutment surface 88 in a radially outward direction, so that the rearward supporting portion 82 deforms. The deformation at the rearward supporting portion 82 is less than the deformation at the forward supporting portion 80. By virtue of the rearward head and holder abutment surfaces 56, 88 having a conical shape the adjustment of the cutting tool 20 from the second pre-locked position to the locked position is smooth and gradual.

By virtue of the threaded engagement located between two conical abutment regions the rotary cutting tool 20 as improved stability against lateral cutting forces.

Advantageously, the design of the forward and rearward head cone angles α, β being greater than the forward and rearward holder cone angles γ, δ by no more than 0.6° (in the released position) ensures conical abutment between the forward head abutment surface 54 and the forward holder abutment surface 84, and the rearward head abutment surface 56 and the rearward holder abutment surface 88 after deformation has occurred (i.e. in the locked position of the rotary cutting tool 20). In accordance with some embodiments of the subject matter of the present application, in the locked position, by virtue of the deformation at the forward and rearward supporting portions 80, 82, the forward and rearward head cone angles α, β and the forward and rearward holder cone angles γ, δ can have the same value. The forward head cone axial height H1 can be greater than the forward holder cone axial height H3. Thus, an interference fit is attained along the full axial extent of the forward holder abutment surface 84. Likewise, the rearward head cone axial height H2 can be greater than the rearward holder cone axial height H4. Thus an interference fit is attained along the full axial extent of the rearward holder abutment surface 88.

In the locked position of the rotary cutting tool 20 a tight fit between the replaceable cutting head 22 and the tool holder 24 is accomplished. The coupling mechanism described herein above provides a quick, self-lock coupling between the replaceable cutting head 22 and the tool holder 24.

It should be noted that a feature of subject matter of the present application is that the two conical abutment regions provides accurate positioning of the replaceable cutting head 22 when retained in the tool holder 24 and additionally prevents the occurrence of axial run-out, even if the external and internal threads 42, 72 are manufactured outside their tolerance limits.

What is claimed is:

1. A replaceable cutting head (22), for rotary cutting operations, having a head longitudinal axis (A) around which the replaceable cutting head (22) rotates in a direction of rotation (R), the head longitudinal axis (A) extending in a forward ($D_F$) to rearward direction ($D_R$), comprising:

- a forward portion forming a cutting portion (26) and a rearward portion forming a mounting portion (28), wherein;
- the mounting portion (28) comprises a male coupling member (38) protruding rearwardly from a rearwardly facing head base surface (40), the head base surface (40) extending transversely with respect to the head longitudinal axis (A), and defining a boundary between the cutting portion (26) and the mounting portion (28), the male coupling member (38) comprising:
- outwardly facing forward and rearward bearing portions (50, 52) and an external thread (42) located therebetween wherein;
- the forward bearing portion (50) comprises a ground, conically shaped forward head abutment surface (54) that tapers inwardly in a rearward direction ($D_R$) defining a forward head cone angle (α);
- the rearward bearing portion (52) comprises a ground, conically shaped rearward head abutment surface (56) that tapers inwardly in a rearward direction ($D_R$) defining a rearward head cone angle (β); and
- the ground, conically shaped forward and rearward head abutment surfaces (54, 56) are formed by grinding with a grinding wheel without reconfiguring an angle of rotation of said grinding wheel when the head abutment surfaces are ground, thereby resulting in the forward and rearward head cone angles (α, β) being within ±0.5° of each other.

2. The replaceable cutting head (22) according to claim 1, wherein

- the forward head cone angle (α) is in the range of $5° \leq \alpha \leq 7°$; and
- the rearward head cone angle (β) is in the range of $5° \leq \beta \leq 7°$.

3. The replaceable cutting head (22) according to claim 2, wherein the forward and rearward head cone angles (α, β) are equal to exactly 6°.

4. The replaceable cutting head (22) according to claim 1, wherein the external thread (42) is a straight, non-tapered thread.

5. The replaceable cutting head (22) according to claim 4, wherein

- the forward head abutment surface (54) lies on an imaginary external forward cone (60) centered about the head longitudinal axis (A);
- the plurality of external thread crests (46) define an imaginary external crest cylinder (62) that is axially delimited by the forward and rearward bearing portions (50, 52); and
- the imaginary external forward cone (60) intersects the imaginary external crest cylinder (62).

6. The replaceable cutting head (22) according to claim 4, wherein

- the rearward head abutment surface (56) lies on an imaginary external rearward cone (64) centered about the head longitudinal axis (A);
- the plurality of external thread roots (48) define an imaginary external root cylinder (66) that is axially delimited by the forward and rearward bearing portions (50, 52); and
- the imaginary external rearward cone (64) intersects the imaginary external root cylinder (66).

7. The replaceable cutting head (22) according to claim 1, wherein

- the major diameter of the external thread (42) closest to the forward bearing portion (50) defines a major external diameter (DE1) that is less than a minimum external forward diameter ($FD_E$) of the forward head abutment surface (54).

8. The replaceable cutting head (22) according to claim 1, wherein

- the minor diameter of the external thread (42) closest to the rearward bearing portion (52) defines a minor external diameter (DE2) that is greater than a maximum external rearward diameter ($RD_E$) of the rearward head abutment surface (56).

9. The replaceable cutting head (22) according to claim 1, wherein

- a maximum external rearward diameter ($RD_E$) of the rearward head abutment surface (56) is less than a minimum external forward diameter ($FD_E$) of the forward head abutment surface (54).

10. The replaceable cutting head (22) according to claim 1, wherein

- the forward head abutment surface (54) has a forward head cone axial height (H1);
- the rearward head abutment surface (56) has a rearward head cone axial height (H2); and the rearward head cone axial height (H2) is greater than the forward head cone axial height (H1).

11. The replaceable cutting head (22) according to claim 1, wherein the head base surface (40) is perpendicular to the head longitudinal axis (A).

12. A tool holder (24), having a holder longitudinal axis (C) extending in the forward ($D_F$) to rearward direction ($D_R$), comprising a female coupling member (68) extending rearwardly from a forwardly facing holder forward surface (70), the holder forward surface (70) extending transversely with respect to the holder longitudinal axis (C), the female coupling member (68) comprising:

inwardly facing forward and rearward supporting portions (80, 82) and an internal thread (72) located therebetween wherein;

the forward supporting portion (80) comprises a forward holder abutment surface (84) that tapers inwardly in a rearward direction ($D_R$) defining a forward holder cone angle (γ);

the rearward supporting portion (82) comprises a rearward holder abutment surface (88) that that tapers inwardly in a rearward direction ($D_R$) defining a rearward holder cone angle (δ);

the forward and rearward holder abutment surfaces (54, 56) are formed by turning operations with a turning tool without reconfiguring said turning tool, thereby resulting in the forward and rearward holder cone angles (γ, δ) being within ±0.5° of each other.

13. The tool holder (24) according to claim 12, wherein the forward holder cone angles (γ) is in the range of $4.7° \leq \gamma \leq 6.7°$; and the rearward holder cone angle (δ) is in the range of $4.7° \leq \delta \leq 6.7°$.

14. The tool holder (24) according to claim 13, wherein the forward and rearward holder cone angles (γ, δ) are equal to 5.7°.

15. The tool holder (24) according to claim 12, wherein the internal thread (72) is a straight, non-tapered thread.

16. The tool holder (24) according to claim 15, wherein the forward holder abutment surface (84) lies on an imaginary internal forward cone (90) centered about the holder longitudinal axis (C);

the plurality of internal thread roots (78) define an imaginary internal root cylinder (96) that is axially delimited by the forward and rearward supporting portions (80, 82); and the imaginary internal forward cone (90) intersects the imaginary internal root cylinder (96).

17. The tool holder (24) according to claim 15, wherein the rearward holder abutment surface (88) lies on an imaginary internal rearward cone (94) centered about the holder longitudinal axis (C);

the plurality of internal thread crests (76) define an imaginary internal crest cylinder (92) that is axially delimited by the forward and rearward supporting portions (80, 82); and the imaginary internal rearward cone (94) intersects an imaginary internal crest cylinder (92).

18. The tool holder (24) according to claim 12, wherein the major diameter of the internal thread (72) closest to the forward supporting portion (80) defines a major internal diameter (DI1) that is less than a minimum internal forward diameter (FDI) of the forward holder abutment surface (84).

19. The tool holder (24) according to claim 12, wherein the minor diameter of the internal thread (72) closest to the rearward supporting portion (82) defines a minor internal diameter (DI2) that is greater than a maximum internal rearward diameter (RDI) of the rearward holder abutment surface (88).

20. The tool holder (24) according to claim 12, wherein a maximum internal rearward diameter (RDI) of the rearward holder abutment surface (88) is less than a minimum internal forward diameter (FDI) of the forward holder abutment surface (84).

21. The tool holder (24) according to claim 12, wherein the forward holder abutment surface (84) has a forward holder cone axial height (H3);

the rearward holder abutment surface (88) has a rearward holder cone axial height (H4); and the rearward holder cone axial height (H4) is greater than the forward holder cone axial height (H3).

22. A rotary cutting tool (20) comprising:

a replaceable cutting head (22) in accordance with claim 1; and a tool holder (24) in accordance with claim 12; wherein the rotary cutting tool (20) is adjustable between a released position and a locked position, wherein in the locked position:

the male coupling member (38) is removably retained in the female coupling member (68);

the external and internal threads (42, 72) threadingly engage each other;

the head base surface (40) abuts the holder forward surface (70);

the forward head abutment surface (54) abuts the forward holder abutment surface (84); and the rearward head abutment surface (56) abuts the rearward holder abutment surface (88).

23. The rotary cutting tool (20) according to claim 22, wherein in the released position:

the male coupling member (38) is located outside of the female coupling member (68);

the forward head cone angle (α) is in the range of $5° \leq \alpha \leq 7°$;

the rearward head cone angle (β) is in the range of $5° \leq \beta \leq 7°$;

the forward holder cone angles (γ) is in the range of $4.7° \leq \gamma \leq 6.7°$; and the rearward holder cone angle (δ) is in the range of $4.7° \leq \delta \leq 6.7°$.

24. The rotary cutting tool (20) according to claim 23, wherein in the released position:

the forward and rearward head cone angles (α, β) are greater than the forward and rearward holder cone angles (γ, δ) by no more than 0.6°.

25. The rotary cutting tool (20) according to claim 24, wherein the forward and rearward head cone angles (α, β) are greater than the forward and rearward holder cone angles (γ, δ) by 0.3°.

26. The rotary cutting tool (20) according to claim 22, wherein in the locked position:

the forward and rearward supporting portions (80, 82) are elastically deformed so that the forward and rearward head cone angles (α, β) and the forward and rearward holder cone angles (γ, δ) have the same value.

27. The rotary cutting tool (20) according to claim 22, wherein the rotary cutting tool (20) is further adjustable between the released position and a first pre-locked position, before the locked position, and in the first pre-locked position:

the external and internal threads (42, 72) threadingly engage each other;

the head base surface (40) is spaced apart from the holder forward surface (70) by a first forward distance (F1);

the forward head abutment surface (54) is in initial contact with the forward holder abutment surface (84); and the rearward head abutment surface (56) is spaced apart from the rearward holder abutment surface (88) by a first rearward distance (R1).

28. The rotary cutting tool (20) according to claim 27, wherein the rotary cutting tool (20) is further adjustable between the first pre-locked position and a second pre-locked position, before the locked position, and in the second pre-locked position:

the external and internal threads (42, 72) threadingly engage each other;

the head base surface (40) is spaced apart from the holder forward surface (70) by a second forward distance (F2), the second forward distance (F2) being less than the first forward distance (F1);

the forward head abutment surface (54) is in contact with the forward holder abutment surface (84); and the rearward head abutment surface (56) is in initial contact with the rearward holder abutment surface (88).

29. The rotary cutting tool (20) according to claim 22, wherein the forward head abutment surface (54) has a forward head cone axial height (H1);

the rearward head abutment surface (56) has a rearward head cone axial height (H2);

the forward holder abutment surface (84) has a forward holder cone axial height (H3); and the rearward holder abutment surface (88) has a rearward holder cone axial height (H4); wherein the forward head cone axial height (H1) is greater than the forward holder cone axial height (H3); and the rearward head cone axial height (H2) is greater than the rearward holder cone axial height (H4).

30. A replaceable cutting head (22), for rotary cutting operations, having a head longitudinal axis (A) around which the replaceable cutting head (22) rotates in a direction of rotation (R), the head longitudinal axis (A) extending in a forward ($D_F$) to rearward direction ($D_R$), comprising:

a forward portion forming a cutting portion (26) and a rearward portion forming a mounting portion (28), wherein;

the mounting portion (28) comprises a male coupling member (38) protruding rearwardly from a rearwardly facing head base surface (40), the head base surface (40) extending transversely with respect to the head longitudinal axis (A), and defining a boundary between the cutting portion (26) and the mounting portion (28), the male coupling member (38) comprising:

outwardly facing forward and rearward bearing portions (50, 52) and an external thread (42) located therebetween wherein;

the forward bearing portion (50) comprises a conically shaped forward head abutment surface (54) that tapers inwardly in a rearward direction ($D_R$) defining a forward head cone angle ($\alpha$);

the rearward bearing portion (52) comprises a conically shaped rearward head abutment surface (56) that tapers inwardly in a rearward direction ($D_R$) defining a rearward head cone angle ($\beta$);

the forward and rearward head cone angles ($\alpha$, $\beta$) have the same value; and the external thread (42) is a straight, non-tapered thread.

* * * * *